US012707472B2

(12) United States Patent
Gao et al.

(10) Patent No.: US 12,707,472 B2
(45) Date of Patent: Aug. 11, 2026

(54) SYSTEMS AND METHODS FOR INITIALIZING HARQ-ACK PROCEDURE BY A SPECIFIC DCI FOR BEAM INDICATION

(71) Applicant: ZTE CORPORATION, Shenzhen (CN)

(72) Inventors: Bo Gao, Shenzhen (CN); Zhaohua Lu, Shenzhen (CN); Ke Yao, Shenzhen (CN); Chuangxin Jiang, Shenzhen (CN); Shujuan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 271 days.

(21) Appl. No.: 18/213,521

(22) Filed: Jun. 23, 2023

(65) Prior Publication Data

US 2023/0336284 A1 Oct. 19, 2023

Related U.S. Application Data

(63) Continuation of application No. PCT/CN2020/139107, filed on Dec. 24, 2020.

(51) Int. Cl.
*H04W 72/23* (2023.01)
*H04L 1/1812* (2023.01)

(52) U.S. Cl.
CPC ........... *H04W 72/23* (2023.01); *H04L 1/1812* (2013.01)

(58) Field of Classification Search
CPC ..................... H04W 72/23–232; H04L 1/1812
See application file for complete search history.

(56) References Cited

U.S. PATENT DOCUMENTS

2019/0222289 A1 7/2019 John Wilson et al.
2019/0320469 A1 10/2019 Huang et al.
2020/0186211 A1 6/2020 Islam et al.
2020/0389224 A1 12/2020 Islam et al.
2021/0218539 A1 7/2021 Hu et al.
2022/0174708 A1* 6/2022 Kim ........................ H04B 7/024
2022/0312456 A1* 9/2022 Guo ...................... H04L 5/0053
(Continued)

FOREIGN PATENT DOCUMENTS

CN 110446269 A 11/2019
CN 110475360 A 11/2019
(Continued)

OTHER PUBLICATIONS

International Search Report and Written Opinion for PCT Appl. No. PCT/CN2020/139107, mailed Sep. 24, 2021 (8 pages).
(Continued)

*Primary Examiner* — Kevin C. Harper
(74) *Attorney, Agent, or Firm* — Foley & Lardner LLP

(57) ABSTRACT

System, methods and apparatuses for initializing HARQ-ACK procedure by a specific DCI for beam indication can include a wireless communication device receiving, from a wireless communication node, a downlink control information (DCI) indicating one or more beam states. The wireless communication device may determine specific information comprising hybrid automatic repeat request acknowledgement (HARQ-ACK) information, according to the DCI. The wireless communication device may transmit, to the wireless communication node, an uplink channel that carries the HARQ-ACK information.

12 Claims, 7 Drawing Sheets

(56) References Cited

U.S. PATENT DOCUMENTS

2023/0379932 A1* 11/2023 Matsumura ....... H04W 72/1263
2023/0379936 A1* 11/2023 Matsumura .......... H04B 7/0639

FOREIGN PATENT DOCUMENTS

| | | | | |
|---|---|---|---|---|
| CN | 110972302 A | | 4/2020 | |
| WO | WO-2018/192218 A1 | | 10/2018 | |
| WO | WO-2021029749 A1 | * | 2/2021 | ............ H04W 72/23 |
| WO | WO-2021121337 A1 | * | 6/2021 | ............ H04W 72/23 |

OTHER PUBLICATIONS

Qualcomm Incorporated: "Remaining Details on QCL" 3GPP TSG RAN WG1 Meeting AH 1801; R1-1800867; Jan. 26, 2018; Vancouver, Canada (8 pages).

Huawei et al., "Enhancements on multi-beam operation in Rel-17", 3GPP TSG RAN WG1 Meeting #103-e, R1-2007586, Nov. 13, 2020, e-Meeting (11 pages).

Lenovo et al., "Enhancements on Multi-beam Operation", 3GPP TSG RAN WG1#103-e, R1-2008910, Nov. 13, 2020, e-Meeting (10 pages).

Moderator (Samsung), "Moderator summary for multi-beam enhancement", 3GPP TSG RAN WG1 #103-e, R1-2008147, Nov. 13, 2020, e-Meeting (30 pages).

NEC, "Discussion on multi-beam operation", 3GPP TSG RAN WG1 #103-e, R1-2008943, Nov. 13, 2020, e-Meeting (4 pages).

Nokia et al., "Enhancements on Multi-beam Operation", 3GPP TSG RAN WG1 #103-e, R1-2008903, Nov. 13, 2020, e-Meeting (31 pages).

NTT Docomo, Inc, "Discussion on multi-beam operation", 3GPP TSG RAN WG1 #103-e, R1-2009174, Nov. 13, 2020, e-Meeting (22 pages).

OPPO, "Enhancements on Multi-Beam Operation", 3GPP TSG RAN WG1 #103-e, R1-2008217, Nov. 13, 2020, e-Meeting (11 pages).

Qualcomm Incorporated, "Enhancements on Multi-beam Operation", 3GPP TSG RAN WG1 Meeting #103-e, R1-2009250, Nov. 13, 2020 (12 pages).

Qualcomm Incorporated, "Enhancements on Multi-TRP for PDCCH, PUCCH and PUSCH", 3GPP TSG-RAN WG1 Meeting #103-e, R1-2009251, Nov. 13, 2020, e-Meeting (33 pages).

Samsung, "Multi-beam enhancements", 3GPP TSG RAN WG1 #103-e, R1-2008148, Nov. 13, 2020, e-Meeting (20 pages).

ZTE, "Enhancements on Multi-beam Operation", 3GPP TSG RAN WG1 Meeting #103-e, R1-2007763, Nov. 13, 2020, e-Meeting (19 pages).

Extended European Search Report on EP Appln No. 20966499.4, dated Jan. 29, 2024 (9 pages).

Moderator (Huawei), Feature lead summary#1 on email discussion 100b-e-NR-unlic-NRU-HARQ-01 (Type-3 HARQ-ACK codebook), 3GPP TSG RAN WG1 Meeting #100bis, R1-2002922, Apr. 30, 2020, e-Meeting (35 pages).

Office Action for KR Appl. No. 10-2023-7024686, dated Jul. 14, 2025 (with English translation, 7 pages).

Qualcomm Incorporated, "Remaining Issues on Multi-TRP Enhancements", 3GPP TSG-RAN WG1 Meeting #103-e, R1-2008610, Nov. 13, 2020, e-Meeting (7 pages).

Communication pursuant to Article 94(3) EPC for EP Appl. No. 20966499.4, dated Sep. 23, 2025 (7 pages).

First Office Action for CN Appl. No. 202311410500.8, dated Oct. 18, 2025 (with English translation, 14 pages).

Communication pursuant to Article 94(3) EPC on EP Appl. No. 20966499.4 dated Mar. 9, 2026 (6 pages).

Second Review Comments Notification on CN Appl. No. 202311410500.8 dated Jan. 30, 2026 (8 pages).

* cited by examiner

500

Transmit/Receive a downlink control information (DCI) indicating one or more beam states — 502

Cause to determine/Determine specific information comprising HARQ-ACK information according to the DCI — 504

Receive/Transmit an uplink channel that carries the HARQ-ACK information — 506

TCI field in DCI

SYSTEMS AND METHODS FOR INITIALIZING HARQ-ACK PROCEDURE BY A SPECIFIC DCI FOR BEAM INDICATION

CROSS-REFERENCE TO RELATED APPLICATION

This application claims the benefit of priority under 35 U.S.C. § 120 as a continuation of International Patent Application No. PCT/CN2020/139107, filed on Dec. 24, 2020, the disclosure of which is incorporated herein by reference in its entirety.

TECHNICAL FIELD

The disclosure relates generally to wireless communications, including but not limited to systems and methods for initializing HARQ-ACK procedure by a specific DCI for beam indication.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive, from a wireless communication node, a downlink control information (DCI) indicating one or more beam states. The wireless communication device may determine specific information comprising hybrid automatic repeat request acknowledgement (HARQ-ACK) information, according to the DCI. The wireless communication device may transmit, to the wireless communication node, an uplink channel that carries the HARQ-ACK information.

In some embodiments, the specific information may further comprise at least one of information about precluding a data channel, information for disabling a transport block (TB), information about signals that at least one of the one or more beam states are applied to, or group information associated with at least one of the one or more beam states. In some embodiments, the wireless communication device may determine the specific information in response to determining that the DCI is scrambled by a specific radio network temporary identifier (RNTI). The specific RNTI may comprise a configured scheduling RNTI (CS-RNTI), a cell (C-RNTI), or a dedicated RNTI for beam state indication, that is configured by radio resource control (RRC) signaling or medium access control control element (MAC CE) signaling.

In some embodiments, the wireless communication device may determine the specific information in response to determining that a bandwidth part (BWP) indicator field in the DCI is set to a specific value. The specific value may comprise '0' or an invalid value. In some embodiments, In some embodiments, the wireless communication device may determine the specific information in response to determining that a new data indicator (NDI) field in the DCI is set to a specific value. The specific value may comprise '0'.

In some embodiments, the wireless communication device may determine the specific information in response to determining that a redundancy value (RV) field in the DCI is set to a specific value. The specific value may comprise bit values each being '0' or each being '1'. At least one of the following can apply: (i) when the RV field is set to a first value, the DCI can be used for semi-persistent scheduling (SPS) release, (ii) when the RV field is set to a third value, at least one of the one or more beam states in the DCI can be applied for DL signals, or (iii) when the RV field is set to a forth value, at least one of the one or more beam states in the DCI can be applied for UL signals.

In some embodiments, the wireless communication device may determine the specific information in response to determining that a modulation and coding scheme (MCS) field in the DCI is set to a specific value. At least one of the following can apply: (i) the specific value comprises '26' or bit values each being '1', (ii) a redundancy value (RV) of the DCI is set to '1', (iii) a new data indicator (NDI) field in the DCI indicates whether at least one of one or more beam states is applied to downlink (DL) signals or uplink (UL) signals, or (iv) all NDI fields in the DCI are set to a same value.

In some embodiments, the wireless communication device may determine the specific information in response to determining that a frequency domain resource assignment (FDRA) field in the DCI is set to a specific value. In some embodiments, the wireless communication device may determine the specific information in response to determining that a time domain resource assignment (TDRA) field in the DCI is set to a specific value. The specific value may comprise '-1' or null.

In some embodiments, the wireless communication device may determine the specific information in response to determining that a physical downlink shared channel (PDSCH) to HARQ (PDSCH-to-HARQ) feedback timing indicator field in the DCI is set to a specific value. The specific value may comprise '-1', null or an invalid value. At least one of the following can apply: (i) a timing of a PDSCH to HARQ-ACK feedback is determined according to a minimum or maximum value of candidate ones in a pool, (ii) the timing of a PDSCH to HARQ-ACK feedback is determined according to a candidate value from a pool, wherein the candidate value is associated with a specific index, a minimum index or a maximum index, or (iii) the HARQ-ACK information is carried by a latest available PUCCH resource or a latest available uplink slot.

In some embodiments, the wireless communication device may determine the specific information in response to determining that a HARQ process number field in the DCI is set to a specific value. The specific value may comprise bit values each being '0'. At least one of the following can apply: (i) the specific value is associated with one of a plurality of applicable cases of at least one of the one or more beam states in the DCI, (ii) when the HARQ process number field is set to a first specific value, at least one of the one or more beam states in the DCI is applied for both downlink (DL) signals and uplink (UL) signals, (iii) when the HARQ process number field is set to a second specific value, at least one of the one or more beam states in the DCI is applied for DL signals, or (iv) when the HARQ process number field is set to a third specific value, at least one of the one or more beam states in the DCI is applied for UL signals. At least one of the first specific value, the second specific value or the third specific value may be configured by radio resource control (RRC) signaling or medium access control control element (MAC CE) signaling.

In some embodiments, the wireless communication device may determine the specific information in response to determining that an antenna port field in the DCI is set to a specific value. The specific value may comprise bit values each being '1', if a single beam state is activated for a codepoint in the DCI by medium access control control element (MAC CE) signaling. In some embodiments, the wireless communication device may determine the specific information in response to determining that a non-downlink-data field in the DCI is present or set with a specific value.

In some embodiments, the wireless communication device may determine the specific information in response to determining that a defined field in the DCI is set to a specific value, and wherein the DCI comprises at least one of DCI format 0_1, DCI format 0_2, DCI format 1_1 or DCI format 1_2. In some embodiments, the wireless communication device may determine the specific information in response to determining that a transmission configuration indicator (TCI) field in the DCI is set to a specific value. A specific bit of the TCI field may be set to a first specific value.

In some embodiments, the wireless communication device may determine the specific information in response to determining that a physical uplink control channel (PUCCH) resource indicator (PRI) field in the DCI is set to a specific value. The PRI field may be set to '0', a minimum index, a maximum index, or an invalid value. The uplink channel may be determined according to a specific, minimum or maximum index of candidate PUCCH resources in a pool. In some embodiments, the wireless communication device may receive, from the wireless communication node, an indication of the specific value via radio resource control (RRC) signaling or medium access control control element (MAC CE) signaling. In some embodiments, the wireless communication device may determine responsive to a setting of a radio resource control (RRC) parameter, the specific information according to the DCI.

In some embodiments, when a modulation and coding scheme (MCS) field in the DCI is set to a fourth specific value and a redundancy value (RV) field of the DCI is set to a fifth specific value, the wireless communication device may disable a transmission block corresponding to the MCS field and the RV field, and determine the specific information in response to the DCI. When a two codeword transmission is enabled with two transmission blocks (TBs), the MCS field may be set to the fourth specific value and the RV field may be set to the fifth specific value for both of the TBs. At least one of the following can apply: (i) when a radio resource control (RRC) parameter is configured for enabling separate indicated beam states for downlink (DL) and uplink (UL) beam indication, a new data indicator (NDI) field of the DCI may be used to indicate whether at least one of the one or more beam states is applied to downlink (DL) signals or uplink (UL) signals, or (ii) when the RRC parameter is configured for joint beam indication, at least one of the one or more beam states may be applied to DL signals and UL signals.

In some embodiments, at least one of the following can apply: (i) when the DCI includes more than one modulation and coding scheme (MCS) fields, the MCS fields can be set to the same value, (ii) when the DCI includes more than one redundancy value (RV) fields, the RV fields can be set to the same value, or when the DCI includes more than one new data indicator (NDI) fields, the NDI fields can be set to the same value. In some embodiments, the wireless communication device may determine signals to which at least one of the one or more beam states are applied, according to a transmission configuration indicator (TCI) field in the DCI. At least one of the following can apply: (i) when a specific bit of the TCI field is set as a first value, the at least one of the one or more beam states can be applied to downlink (DL) signals, or the procedure of determining the specific information can be disabled for the DCI, or (ii) when the specific bit of the TCI field is set as a second value, the at least one of the one or more beam states can be applied to uplink (UL) signals, or the specific information can be determined according to the DCI.

In some embodiments, the wireless communication device may determine signals to which at least one of the one or more beam states are applied, according to a transmission configuration indicator (TCI) field in the DCI. The signals to which at least one of the one or more beam states are applied may be determined according to a radio resource control (RRC) signaling or medium access control control element (MAC CE) signaling. In some embodiments, the wireless communication device may determine a beam state in the DCI, according to a setting of a radio resource control (RRC) parameter or meeting of a condition. The condition may include that at least one of the one or more beam states is applied to uplink signals, a data channel transmission is precluded, or a transport block (TB) is disabled. The beam state can be applied a number of time units after the DCI, or the beam state can be applied a number of time units after a HARQ-ACK transmission corresponding to the DCI. Each of the one or more beam states may comprise a transmission configuration indicator (TCI) state, a quasi-co-location (QCL) state, spatial relation information, a reference signal (RS), a spatial filter or pre-coding information.

At least one aspect is directed to a system, method, apparatus, or a computer-readable medium. A wireless communication node may transmit, to a wireless communication device, a downlink control information (DCI) indicating one or more beam states. The wireless communication node may cause the wireless communication device to determine specific information comprising hybrid automatic repeat request acknowledgement (HARQ-ACK) information, according to the DCI. The wireless communication node may receive, from the wireless communication device, an uplink channel that carries the HARQ-ACK information.

Some of the embodiments described herein allow for reusing existing DCI field, a newly introduced DCI or RNTI to indicate HARQ-ACK information directly in response to the DCI with beam indication. The applicable channel/RS/group information associated with beam state in the DCI (e.g., DL only, UL only and both DL and UL, group information) can be determined together. In addition, a flexible method of timeline for beam state indication is proposed considering the different scenarios of beam indication (e.g., joint indication for both DL and UL, DL only and UL only).

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
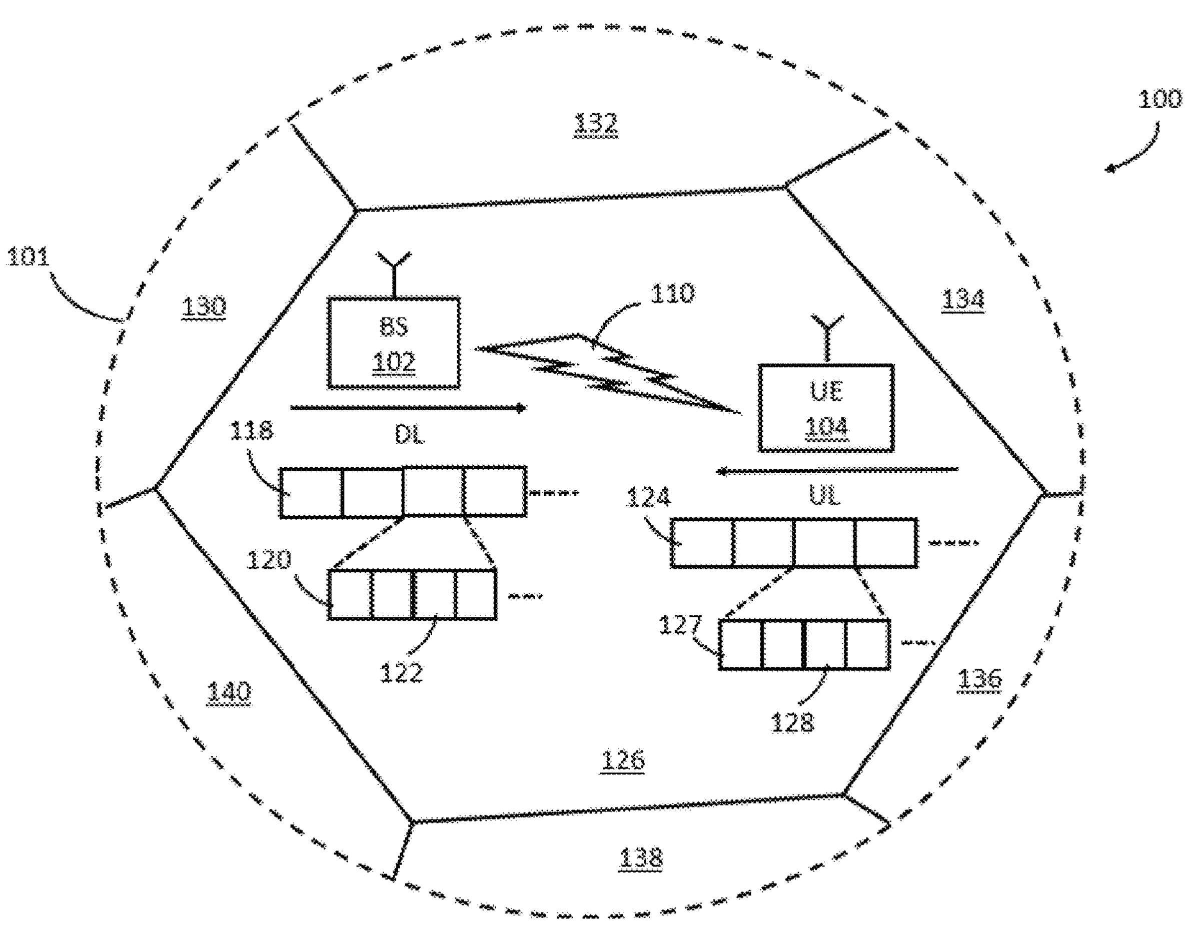
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
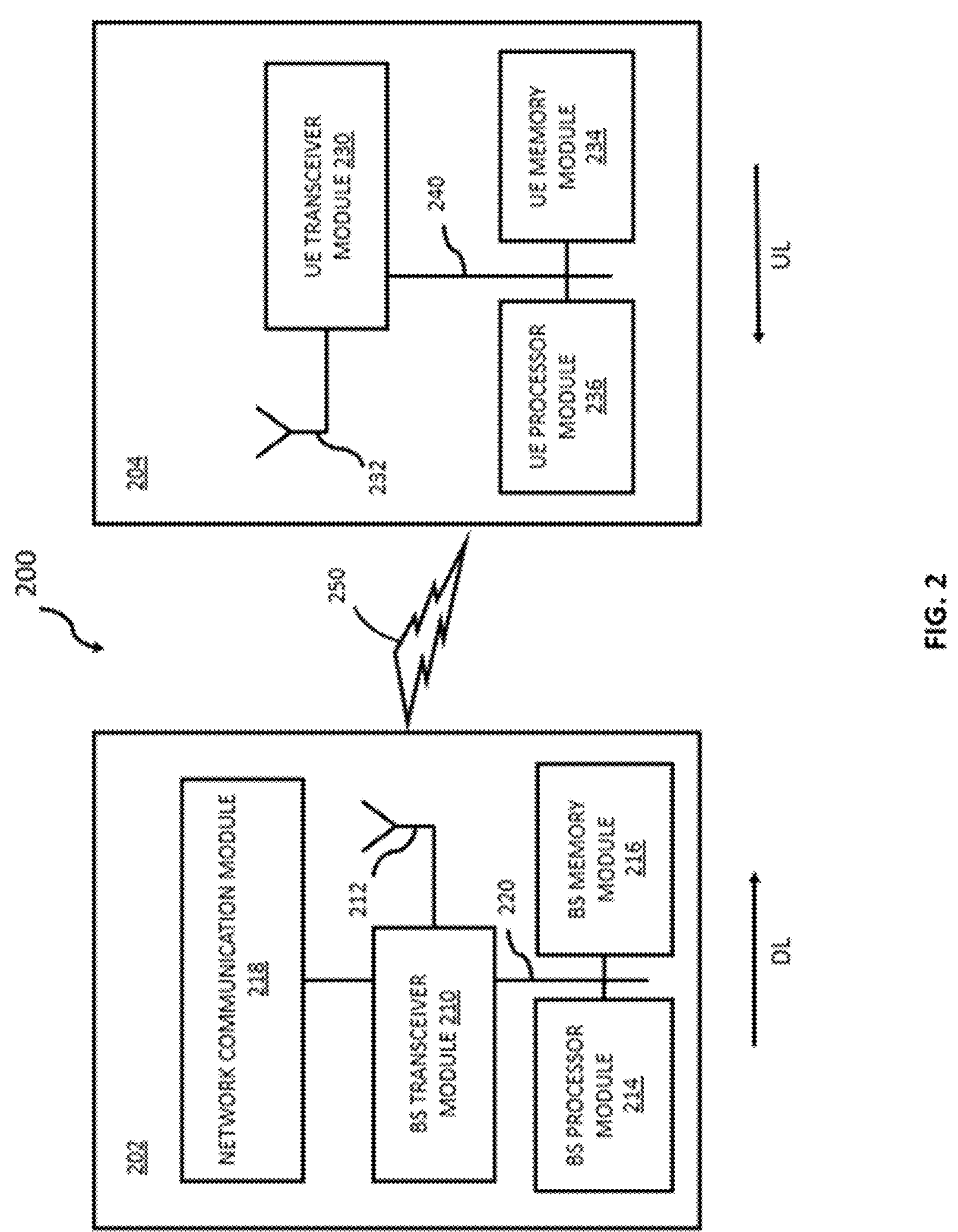
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods Initializing HARQ-ACK Procedure

Figure 3:
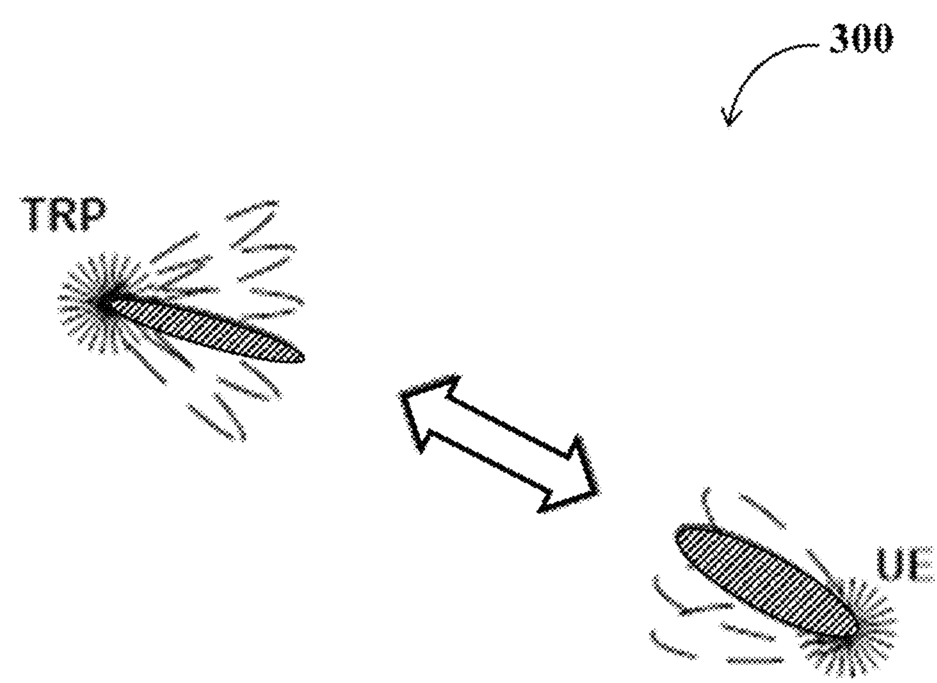
FIG. 3 shows a diagram illustrating beam based UL/DL transmission in the case of one-TRP and one-panel.

Given the expense of wide or ultra-wide spectrum resources, significant propagation loss induced by the extremely high frequency is a noticeable challenge. To solve this, antenna array and beam-forming training technologies using massive multi-input-multi-output (MIMO), e.g., up to 1024 antenna elements for one node, have been adopted to achieve beam alignment and obtain sufficiently high antenna gain. To keep low implementation cost while still benefit from antenna array, analog phase shifters become very attractive for implementing mmWave beam-forming, which means that the number of controllable phases is finite and the constant modulus constraints are placed on these antenna elements. Given the pre-specified beam patterns, the variable-phase-shift-based BF training targets to identify the best pattern for subsequent data transmission in the one transmission point (one-TRP) and one-panel case, which is shown in FIG. 3. FIG. 3 shows a diagram 300 illustrating beam based UL/DL transmission in the case of one-TRP and one-panel. The hashed lobes represent the radiation patterns of the selected antennae for transmission in the TRP and the wireless communication device 104 or 204.

Figures 4, 5:
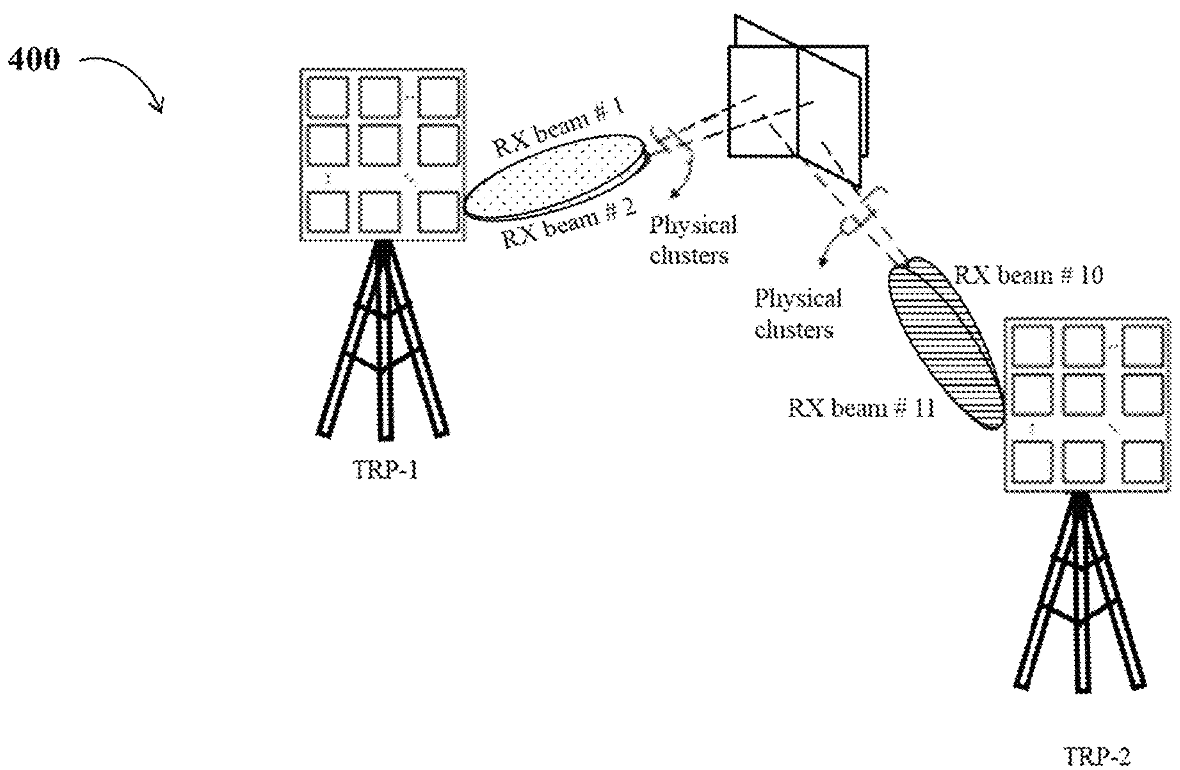
FIG. 4, shows a diagram illustrating beam measurement and reporting in the case of multi-TRP and where the wireless communication device has four panels.
FIG. 5 shows a flowchart illustrating a method of wireless communication, in accordance with some embodiments of the present disclosure.

Referring to FIG. 4, a diagram 400 illustrating beam measurement and reporting in the case of multi-TRP and where the wireless communication device 104 or 204 has four panels. Generally, the multi-TRP and multi-panel cases may be considered for beyond 5G gNB (base station) and the next-generation communications. The use of multiple panels for the wireless communication device 104 or 204 allows for transmission/reception from various angles and therefore enhancing coverage. As a typical case, a panel for TRP and the wireless communication device 104 or 204 can have two transceiver units (TXRUs), which are associated with cross polarization accordingly. Therefore, in order to achieve high RANK or multi-layer transmission, the TRP and the wireless communication device 104 or 204 may try to use different beams generated from different panels, which is also called as simultaneous transmission across multiple panel (STxMP). The objective is to sufficiently use the capability of each panel, such as its associated TXRUs.

In 5th Generation (5G) new radio (NR), a mechanism of downlink control information (DCI) based beam indication (e.g., transmission configuration indicator (TCI) indication in the DCI is applied to downlink (DL) and uplink (UL) control and data channels) is employed for dynamic beam switching. The current DCI format is based on DCI format 1_1 and 1_2 for scheduling physical downlink scheduling channel (PDSCH), and a hybrid automatic repeat request (HARD)-acknowledge (ACK) procedure is reported by the wireless communication device 104 or 204 to the wireless communication node 102 or 202 for PDSCH reception. The requirement of beam updating is relevant to physical channel changes (e.g., movement, rotation and blockage of the wireless communication device 104 or 204) rather than scheduling request for DL data (i.e., PDSCH). In other words, the wireless communication device 104 or 204 initiates beam updating responsive to PDSCH reception, not responsive to received DCI based beam indication. This approach leads to some drawbacks of coupling between beam indication and PDSCH transmission First, acknowledge information of PDSCH, e.g., ACK, and negative acknowledgment (NACK), reported by the wireless communication device 104 or 204 can not clearly imply whether the DCI scheduling PDSCH is decoding successfully or not. In fact, the NACK is interpreted by the wireless communication node 102 or 202 as indicating that the PDSCH is decoded unsuccessfully. However, the failure may occur either when DCI is decoded successfully and decoding of PDSCH fails, or due to decoding failure of DCI. For the former, from the perspective of beam updating, the DCI retransmission may not be needed. However, for the latter, the DCI retransmission may be needed. The event of requiring DL data (e.g., PDSCH) transmission may not occur simultaneously with the event of beam updating. When coupling both of them together, gNB may have to transmit a useless/dummy PDSCH just for indicating a new beam, or the system still has to wait for a PDSCH transmission while beam updating.

In order to have a common/separate DL and UL beam indication framework as well as reliable support of DCI retransmission, the DCI format can be refined or redesigned for directly initializing a HARQ-ACK procedure rather than just being based on the normal DCI format 1_1/1_2 for PDSCH transmission. In refining or redesigning the DCI format, some issues are to be considered and handled. First, reusing existing field, introducing a new radio network temporary identity (RNTI) corresponding to a DCI format, and/or introducing a new field in the DCI format may be considered for directly initializing a HARQ-ACK procedure. Also, in considering the case of separate beam indication for DL and UL channel/reference signals (RSs) (e.g., due to maximum power exposure (MPE) impact for human being), the applicable scope of DCI can involve both DL and UL, DL only and UL only. In multi-transmission point (multi-TRP) cases, the applicable scope of indicated beam state is to be considered, e.g., to one of the TRP(s) or all serving TRP(s).

Second, a candidate DCI codepoint used for beam indication can be designed to be compatible with the three cases of both DL and UL, DL only and UL only. The medium access control control element (MAC-CE) and radio resource control (RRC) pools for candidate beam state can be fully considered, e.g., a common RRC pool for both DL and UL, and separate MAC-CE activated pool(s) for DL and UL. Third, the applicable timing of indicated beam state by DCI can be fully considered. Specifically, two potential cases are to be considered, e.g., a DCI scheduling PDSCH or a DCI that does not schedule PDSCH (e.g., directly initializing HARQ-ACK procedure as discussed in further detail herein). Furthermore, the backward compatibility for Rel-15/Rel-16 beam state indication, e.g., DCI format 1_1/1_2 only applied to the scheduled PDSCH transmission, is to be considered.

Note that, as used herein, a "beam state" can be equivalent to, or can include, quasi-co-location (QCL) state, transmission configuration indicator (TCI) state, spatial relation (also called spatial relation information), reference signal (RS), spatial filter or pre-coding. Furthermore, "beam state" can be referred to herein as "beam". Also, a "Tx beam" is equivalent to, or can include, QCL state, TCI state, spatial relation state, DL reference signal, UL reference signal, Tx spatial filter or Tx precoding. An "Rx beam" is equivalent to, or can include, QCL state, TCI state, spatial relation state, spatial filter, Rx spatial filter or Rx precoding. A "beam ID" is equivalent to, or can include, QCL state index, TCI state index, spatial relation state index, reference signal index, spatial filter index or precoding index. The spatial filter, also referred to herein as spatial-domain filter, can be either on the wireless communication device side or on the wireless communication node side.

As used herein, "spatial relation information" can include one or more reference RSs, and is used to represent the same or quasi-co "spatial relation" between targeted "RS or channel" and the one or more reference RSs. The term "spatial relation" means the beam, spatial parameter, or spatial domain filter.

As used herein, "QCL state" can include one or more reference RSs and their corresponding QCL type parameters. The QCL type parameters can include Doppler spread, Doppler shift, delay spread, average delay, average gain, spatial parameter or a combination thereof. As used herein, "TCI state" is equivalent to, or can include, "QCL state". Also, QCL type-D is equivalent to, or can include, spatial parameter or spatial Rx parameter. Note that, as used herein, a RS comprises channel state information reference signal (CSI-RS), synchronization signal block (SSB) (which is also called as SS/PBCH), demodulation reference signal (DMRS), sounding reference signal (SRS), physical random access channel (PRACH) or a combination thereof.

The RS comprises at least DL reference signal and UL reference signal. As used herein, DL RS at least comprises CSI-RS, SSB, DMRS (e.g., DL DMRS). As used herein, UL RS at least comprises SRS, DMRS (e.g., UL DMRS), and PRACH. As used herein, "UL signal" can be PUCCH, PUSCH, or SRS. As used herein, "DL signal" can be PDCCH, PDSCH, or CSI-RS. Note that, in this patent, "time unit" can be sub-symbol, symbol, slot, sub-frame, frame, or transmission occasion.

The power control parameter includes target power (also called as P0), path loss RS, scaling factor for path loss (also called as alpha), or closed loop process. As used herein, the path-loss can be couple loss. Also, by definition, "HARQ-ACK" is equivalent to HARQ, ACK-NACK, UL-ACK or confirmation information for a transmission. As used herein, "DCI" is equivalent to "PDCCH". Furthermore, "DCI" can include TCI indication command, UE specific DCI, group common DCI, DCI scheduling PUSCH/PDSCH, or DCI without scheduling PUSCH/PDSCH. The term "DCI" is used herein to refer to "beam specific DCI", "beam indication DCI" or "TCI indication DCI" if there is no specific description.

As used herein, 'inapplicable value' is equivalent to 'non-configured/activated value', 'deactivated value', 'non-defined value' or 'reserved value'. As used herein, the term "group information" is equivalent to (or can refer to) "CORESET Pool", "TRP", "information grouping one or more reference signals", "resource set", "panel", "sub-array", "antenna group", "antenna port group", "group of antenna ports", "beam group", "transmission entity/unit", or "reception entity/unit". Furthermore, the "group information" can represent the UE panel and some features related to the UE panel. The "group information" can be equivalent to (or can refer to) "group state" or "group ID". As used herein, all '0's in a field is equivalent to a value of 0 and is equivalent to that each bits of field is set to 0. Similarly, all Ts in a field is equivalent to maximum candidate value of a field and is equivalent to that each bit of a field is set to 1

Referring to FIG. 5, a flowchart illustrating a method 500 of wireless communication is shown, in accordance with some embodiments of the present disclosure. The method 500 can include the wireless communication node 102 or 202 transmitting, and the wireless communication device 104 or 204 receiving, a downlink control information (DCI) indicating one or more beam states (STEP 502). The method 500 can include the wireless communication node 102 or 202 causing the wireless communication device 104 or 204 to determine, and the wireless communication device 104 or 204 determining, specific information comprising hybrid automatic repeat request acknowledgement (HARQ-ACK) information, according to the DCI (STEP 504). The method 500 can include the wireless communication device 104 or 204 transmitting, and the wireless communication node 102 or 202 receiving, an uplink channel that carries the HARQ-ACK information (STEP 506). Various embodiments of the method 500 and respective implementations are discussed in further below.

The wireless communication device 104 or 204 can receive, from the wireless communication node 102 or 202, a DCI indicating one or more beam states. The DCI can include a beam state indication (e.g., TCI indication in DCI) to update DL and/or UL beam state. The DCI can trigger a HARQ-ACK procedure on the wireless communication device side, causing the wireless communication device 104 or 204 to send an ACK/NACK to wireless communication node 102 or 202. The applicable timing for the update can be determined according to the report of HARQ-ACK to the wireless communication node 102 or 202. The DCI format may be based on existing DCI formats (e.g., DCI format 1_1 or 1_2 scheduling PDSCH).

According to at least a first embodiment, the DCI can be enabled to initialize/trigger a HARQ-ACK procedure or non-PDSCH transmission via a new RNTI or specific value for some existing fields or newly introduced fields in the DCI. The wireless communication device 104 or 204 can determine at least one of HARQ-ACK information associated with a DCI, non-PDSCH transmission, or disabling a transport block (TB), and applicable channel/RS/group information associated with beam state in the DCI (e.g., DL only, UL only and both DL and UL, group information) according to various ways, as discussed in further detail below. Specifically, the HARQ-ACK information can be indicated in various ways in the DCI. In some implementations, when the DCI is received successfully, the HARQ-ACK information is set to ACK (e.g., 1); otherwise, the HARQ-ACK information is set to NACK (e.g., 0).

In some implementations, the DCI can be scrambled by a specific RNTI. The specific RNTI may include CS-RNTI or C-RNTI. The specific RNTI may be a dedicated RNTI for beam state indication. The dedicated RNTI can be configured by RRC or MAC-CE. In some implementations, the bandwidth part (BWP) indicator field in the DCI can be set to 'a specific value'. For instance, the BWP indicator field in the DCI can be set to '0' or an inapplicable value. That is, the specific value can be '0' or inapplicable. In some implementations, a new data indicator (NDI) field in the DCI can be set to 'a specific value'. For instance, the new data indicator field in the DCI format for the enabled transport block can be set to '0'. That is, the specific value can be '0'.

In some implementations, the redundancy version (RV) field in the DCI can be set to 'a specific value'. For instance, the RV field can be set to all '0's or 1. That is, the specific value can be all '0's or 1. In addition, when the RV field is set to a first value (e.g., '00'), the DCI can be used for semi persisting scheduling (SPS) release. When the RV field is set to a second value (e.g., '01'), the beam state in the DCI can be applied for both DL signals and UL signals. When the RV field is set to a third value (e.g., '10'), the beam state in the DCI can be applied for DL signals. When the RV field is set to a forth value (e.g., '11'), the beam state in the DCI can be applied for UL signals. For example, the DCI can be scrambled by CS-RNTI, and the RV field in the DCI can be set to 'a specific value' (e.g., one out of above first, second, third or fourth values). The wireless communication node 102 or 202 can generate HARQ-ACK information associated with the DCI, and determine the applicable scope of beam state in the DCI according to the RV field.

In some implementations, the modulation and coding scheme (MCS) field in the DCI can be set to 'a specific value'. For instance, the MCS field can be set to all '1's or 26. That is, the specific value can be all 1's or 26. Currently, when the MCS field is set to 26, the corresponding MCS is nearly useless in practice. The current disclosure proposes using the specific value of 26 as a flag for indicating the individual HARQ-ACK information associated with the DCI. In other words, that value "26" is assumed to be an inapplicable value for determining MCS for PDSCH transmission. The MCS field can be set to 26 and the RV field can be set to 1. That is, the specific value of MCS field can be 26 while the value of the RV field can be 1. In general, various combinations of MCS, NDI and RV fields for TBs corresponding to a PDSCH transmission (e.g., up to 2 TBs can be scheduled for PDSCH by the DCI). For scheduling a single TB for the DCI, when MCS field is set to 26 and the RV field is set to 1, the corresponding TB can be disabled and HARQ-ACK information associated with the DCI can be determined by the wireless communication device 104 or 204. Furthermore, the NDI field can further indicate DL only or UL only. If there are multiple NDI fields in the DCI, the wireless communication node 102 or 202 can set the same value to all NDI fields.

In some implementations, a frequency domain resource assignment (FDRA) field in the DCI can be set to 'a specific value'. For instance, the FDRA field can be set (e.g., by the wireless communication node 102 or 202) to all Ts. That is, the specific value can be all '1's. In some implementations, for DCI format 0_0, 0_1 and/or 0_2, the FDRA field can be set to all '0's, that is, the specific value can be all '0's, for FDRA Type 2 with $\mu$=1. Otherwise, the FDRA field can be set to all '1's, that is, the specific value can be set to all '1's. In some implementations, for DCI format 1_0, 1_1 and/or 1_2, the FDRA field can be set to all '0's, that is, the specific value can be set to all '0's, for FDRA Type 0 or for dynamicSwitch. The FDRA field can be set to all '1's for FDRA Type 1. That is, the specific value can be all 1's. The specific value in the FDRA field can be inapplicable value for determining frequency resource for PDSCH.

In some implementations, a time domain resource assignment (TDRA) field in the DCI can be set to 'a specific value'. For instance, the TDRA field can be set to '-1' or Null. That is, the specific value can be set '-1' or Null. In some implementations, a PDSCH-to-HARQ feedback timing indicator field in the DCI can be set to 'a specific value'. For instance, the PDSCH-to-HARQ feedback timing indicator field can be set to '-1', Null or inapplicable value. That is, the specific value can be '-1', Null or inapplicable. In such case, the wireless communication device 104 or 204 can determine the value of PDSCH-to-HARQ feedback timing for determining HARQ-ACK information according to minimum or maximum value of candidate ones in a pool. The value of PDSCH-to-HARQ feedback timing for determining HARQ-ACK information can be determined according to a candidate value from a pool. The candidate value can be associated with a specific index, minimum index or maximum index. The HARQ-ACK information associated with the DCI can be carried by the latest available PUCCH resource or latest available UL slot.

In some implementations, a HARQ process number field in the DCI can be set to 'a specific value'. For instance, the HARQ process number field can be set to all '0's. That is, the specific value can be all '0's. The specific value can be associated with one of applicable cases of the indicated beam state (e.g., DL only, UL only and both DL and UL). When the HARQ process number field is set to a first value (e.g., 1), the beam state in the DCI can be applied for both DL signals and UL signals. When the HARQ process number field is set to a second value (e.g., 2), the beam state in the DCI can be applied for DL signals. When the HARQ process number field is set to a third value (e.g., 3), the beam state in the DCI can be applied for UL signals. The first, second or third values can be configured by RRC.

In some implementations, an antenna port(s) field in the DCI can be set to 'a specific value'. For instance, the antenna port(s) field in the DCI can be set to all '1's. That is, the specific value can be all '1's, e.g., by reusing a reserved bit. The antenna port(s) field in the DCI can be set to 'a specific value' if only single TCI state is activated by MAC-CE. In some implementations, a non-DL-data field in the DCI can be indicated (or used). For instance, if the non-DL-data field in the DCI is indicated, at least one of HARQ-ACK information associated with a DCI, non-PDSCH transmission, or disabling a transport block (TB) can be determined by the wireless communication device 104 or 204. For instance, the non-DL-data field can be introduced, or used, for DCI format 0_1 or DCI format 0_2, DCI format 1_1 or DCI format 1_2.

In some implementations, a new field in the DCI can be set to 'a specific value'. For instance, if the new field in the DCI is set to 'a specific value', at least one of HARQ-ACK information associated with the DCI, non-PDSCH transmission, or disabling a transport block (TB) can be determined by the wireless communication device 104 or 204. The new field may be introduced for DCI format 1_1 or DCI format 1_2. The new field may be named as "non-DL-data field" or "direct HARQ-ACK feedback field". In some implementations, a TCI field can be set to 'a specific value'. For instance, a specific bit, e.g., most significant bit (MSB), in the TCI field can be to set to 'a specific value', and the other bit(s) can be used for indicating activating beam state/TCI state for DL/UL signal.

In some implementations, a PUCCH resource indicator (PRI) field can be set to 'a specific value'. For instance, the PRI field can be set to '0', minimum index, maximum index, or inapplicable value. That is, the specific value can be '0', minimum index, maximum index, or inapplicable. In such case, the wireless communication device 104 or 204 can determine the PUCCH for carrying HARQ-ACK information according to minimum or maximum value of candidate PUCCH resources in a pool.

In some implementations, when the beam state is activated by a MAC-CE command, the beam state can be further configured with the applicable scope, e.g., DL only, UL only or both DL and UL, or can correspond to HARQ-ACK information associated with a DCI carrying the beam state, non-PDSCH transmission, or disabling a transport block (TB).

In some implementations, an RRC parameter can be set for enabling the determination of the at least one of HARQ-ACK information associated with the DCI, non-PDSCH transmission, or disabling a transport block (TB), and applicable channel/RS/group information associated with beam state in the DCI (e.g., DL only, UL only and both DL and UL, group information) by the wireless communication device 104 or 204 For instance, the above discussed specific value(s) can be configured by RRC or MAC-CE. For instance, the above specific value(s) can be inapplicable value(s) or reserved value(s). In order to distinguish a DCI format only for beam indication and a DCI format for scheduling a PDSCH, a new field named as "non-DL-data field" can be introduced for a normal DCI format (e.g., DCI format 1_1 and DCI format 1_2). When the new field is set to 1, there is no PDSCH to be scheduled by the DCI, and the beam state indicated in the DCI can be applied to UL only. Otherwise, if this new field is set to 0, there is a PDSCH scheduled by the DCI and the beam state indicated in the DCI can be applied to DL only. In such case, the DCI can be scrambled by C-RNTI.

Figure 6:
FIG. 6 shows a diagram illustrating an example for independent HARQ-ACK procedure corresponding to the DCI with beam state indication, in accordance with some embodiments of the present disclosure.
Figure 6:
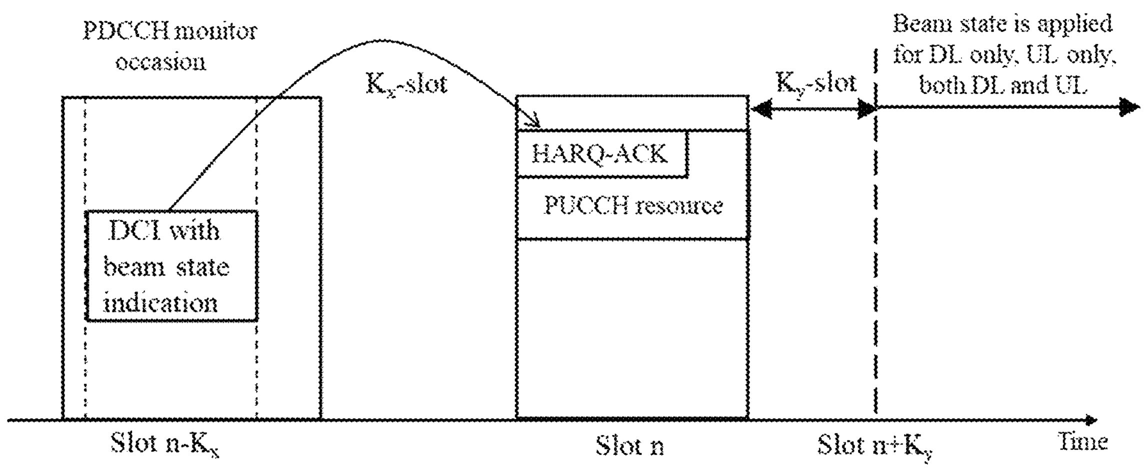

Referring to FIG. 6, a diagram 600 illustrating an example for independent HARQ-ACK procedure corresponding to the DCI with beam state indication, in accordance with some embodiments of the present disclosure. The wireless communication device 104 or 204 can receive the DCI indicating a beam state (e.g., a TCI state/codepoint) for updating the beam of DL/UL signals in time slot n-Kg. In such case the new field named as "non-DL-data field" can be set to 1, and the wireless communication device 104 or 204 can report HARQ-ACK information to the wireless communication node 102 or 202 directly in response to the DCI reception. The corresponding HARQ-ACK information bit can be reported by a PUCCH resource in the slot n, where $K_x$ is configured by a RRC parameter or indicated by the DCI. Ky slots after transmitting the HARQ-ACK information, the indicated beam state is applied for DL signal, UL signaling or both DL and UL signals accordingly.

In some embodiments, the HARQ process number field can be reused to identify beam-specific DCI. There are several bits for indicating the HARQ process number for scheduling PDSCH in normal DCI format (e.g., DCI format 1_1, or DCI format 1_2). For instance, when there is an immediate HARQ-ACK procedure for the DCI reception, the HARQ process number field can be further reused for other purposes. The specific value of HARQ process number for indicating beam state can configured by RRC. An advantage of configuring the HARQ process number by RRC is compatibility with the existing functionality of multiple configurations for UL grant Type 2 PUSCH or for SPS PDSCH (e.g., for URLLC). In some implementations, if the HARQ process number field is set to a first value (e.g., '01'), the beam state in the DCI can be applied for both DL signals and UL signals. If the HARQ process number field is set to a second value (e.g., '10'), the beam state in the DCI can be applied for DL signals. If the HARQ process number field is set to a third value (e.g., '11'), the beam state in the DCI can be applied for UL signals.

Below is a list of various fields for DCI format 1_1 for scheduling PDSCH transmission, and the number of bits associates with these fields.

- Frequency domain resource assignment (FDRA) field - the number of bits is determined according to RRC parameters

... ...

- HARQ process number - 4bits

... ...

For transport block (TB) 1:

- Modulation and coding scheme (MCS) field - 5bits
- New data indicator (NDI) field - 1 bit
- Redundancy version (RV) field - 2 bit For transport block (TB) 2:

-continued

- Modulation and coding scheme (MCS) field - 5bits
- New data indicator (NDI) field - 1 bit
- Redundancy version (RV) field - 2 bit

... ...

When the DCI is scrambled with CS-RNTI, the HARQ process number field in the DCI can indicate a same value as provided by a RRC parameter corresponding to the DCI indication. and the condition in Table 1 is met. The HARQ-ACK information associated with a DCI can be determined directly in response to the DCI. In some implementations, one HARQ procedure may be associated with DL only mode, while another HARQ procedure may be associated with UL only mode.

TABLE 1

Condition for initializing a HARQ-ACK procedure directly for DCI with beam indication.

| | DCI format 0_0/0_1/0_2 | DCI format 1_0/1_1/1_2 |
|---|---|---|
| Redundancy version | set to all '0's | set to all '0's |
| Modulation and coding scheme | set to all '1's | set to all '1's |
| Frequency domain resource assignment | set to all '0's for FDRA Type 2 with μ = 1 set to all '1's, otherwise | set to all '0's for FDRA Type 0 or for dynamicSwitch set to all '1's for FDRA Type 1 |

In some implementations, when the MCS is set to a high value (e.g., high-order modulation and high target code rate), the MCS of the PDSCH re-transmission may be reduced. The network can use the high MCS value and a specific RV value to disable a TB for PDSCH. In some implementations, when, in the DCI, the MCS field is set to a first specific value (e.g., 26) and the RV field is set to a second specific value (e.g., 1. FYI, the value of RV field is set to '0', '2', '3', '1' in order for PDSCH retransmission, so when RV is set to '1' it means that there is a fourth transmission for the same PDSCH/TB), the TB corresponding to the MCS and RV fields can be disabled, and the wireless communication device 104 or 204 can determine the HARQ-ACK information associated with a DCI directly in response to the DCI. When two codeword transmission is enabled, e.g., 2 TBs are used for PDSCH transmission, and when the MCS field is set to a first specific value and the RV field is set to a second specific value for both of TBs, the wireless communication device 104 or 204 can determine HARQ-ACK information associated with a DCI directly in response to the DCI. In such case, there are no TBs to be transmitted. When an RRC parameter is configured for enabling separate DL and UL beam indication, the NDI field can further indicate DL only or UL only. If there are more than one NDI fields in the DCI, the same value are to be set to all NDI fields.

The list below recites the fields for DCI format 1_1 for scheduling PDSCH transmission and the respective bits.

- Frequency domain resource assignment (FDRA) field - the number of bits is determined according to RRC parameters

... ...

For transport block (TB) 1:

- Modulation and coding scheme (MCS) field - 5bits
- New data indicator (NDI) field - 1 bit -continued

```
-    Redundancy version (RV) field - 2 bit
For transport block (TB) 2:
-    Modulation and coding scheme (MCS) field - 5bits
-    New data indicator (NDI) field - 1 bit
-    Redundancy version (RV) field - 2 bit
... ...
```

For each TB, there can be a set of an MCS field, NDI field and RV field. Since there is an independent HARQ-ACK procedure directly in response to DCI with beam indication, no PDSCH transmission is expected. Therefore, the "inapplicable" value for MCS and RV field can be used for disabling TB, e.g., to disable PDSCH transmission. For 2 TB case, the corresponding MCS and RV fields are to be both configured with "inapplicable" value. When an RRC parameter is configured for enabling separate DL and UL beam indication, the NDI field can further indicate that the indicated beam state is applied to DL only or UL only. For instance, the value '1' and '0' can corresponds to DL only and UL only, respectively. When an RRC parameter is configured for joint beam indication, the NDI field can be reserved and the beam state indicated in the DCI (e.g., TCI state/TCI codepoint) can be applied to both DL and UL.

Beam state (also called TCI state) can be indicated by TCI field in the DCI, and there are 3 bits for the TCI field. Considering a redesign of this TCI field, the MSB field in TCI field can be used to indicate independent HARQ procedure, with no DL data transmission or applicable scope of beam state in the DCI (e.g., DL only, UL only and both DL and UL). The MSB of the field may be jointly used for indicating whether the beam state (or TCI state or TCI codepoint) is to be applied to DL only or UL only, if a separate DL and UL beam indication function is enabled. Otherwise, if separate DL and UL beam indication is disabled, all bits of the TCI field can be used for indicating a TCI state, regardless of MSB or LSB. When the MSB is set to be a first value (e.g., 0), the TCI state can be applied to DL-only, and there is no separate HARQ procedure for the DCI (e.g., there is still an existing HARQ-ACK procedure for PDSCH scheduled by the DCI). When the MSB is set to a second value (e.g., 1), the TCI state can be applied to UL-only, and there is an independent HARQ-ACK information associated with the DCI. The other bit(s) in TCI state can be used to indicate the candidate TCI state.

Figure 7:
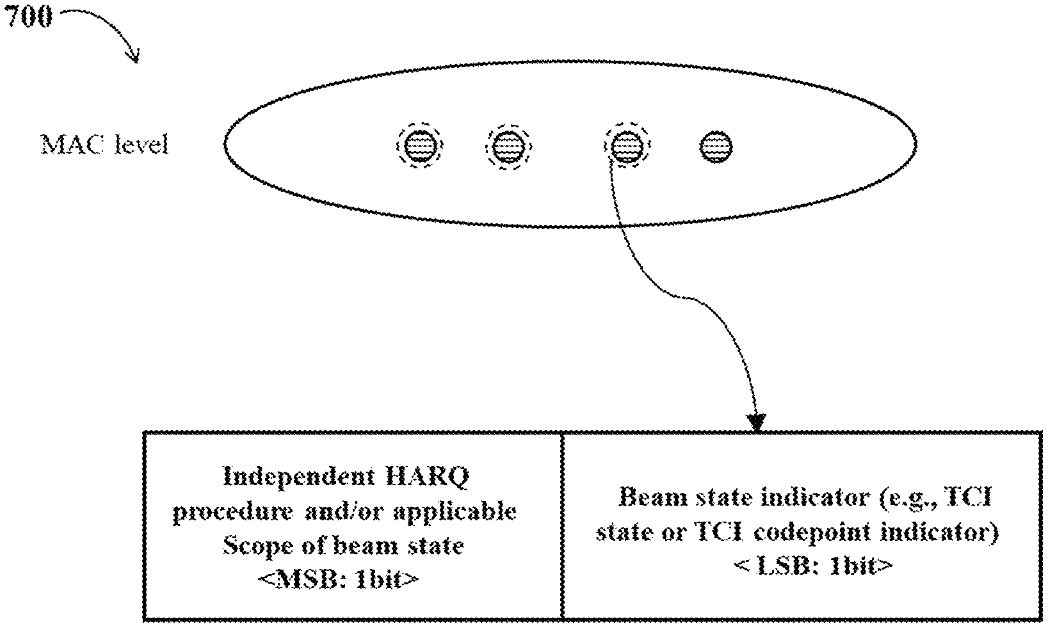
FIG. 7 shows a diagram illustrating an example redesign of the TCI field for identifying beam-specific DCI is shown, in accordance with example embodiments of the current disclosure.

Referring now to FIG. 7, a diagram 700 illustrating an example redesign of the TCI field for identifying beam-specific DCI is shown, in accordance with example embodiments of the current disclosure. In this example, when separate beam indication is enabled, up to four beam states can be activated by MAC-CE in MAC-level. The MSB field is used for indicating whether there is an independent HARQ procedure and/or the applicable scope of beam state. The small (horizontally hashed) circles represent various beam states. Those with outer circles (dashed circles) around them represent activated beam states at the MAC level.

In some embodiments, when the beam state(s) from a pool configured by RRC is activated by a MAC-CE command, the beam state can be further configured with the applicable scope, e.g., DL only, UL only or both DL and UL, or can correspond to HARQ-ACK information associated with a DCI carrying the beam state, non-PDSCH transmission, or disabling a transport block (TB). When the DCI is scrambled by CS-RNTI and NDI field is to indicate a specific value (e.g., 1), the DCI is used for beam indication with independent HARQ-ACK information (e.g., there is no DL data transmission)._When the beam state is activated by a MAC-CE command, the beam state can be further configured with the applicable scope, e.g., DL only, UL only or both DL and UL.

Figure 8:
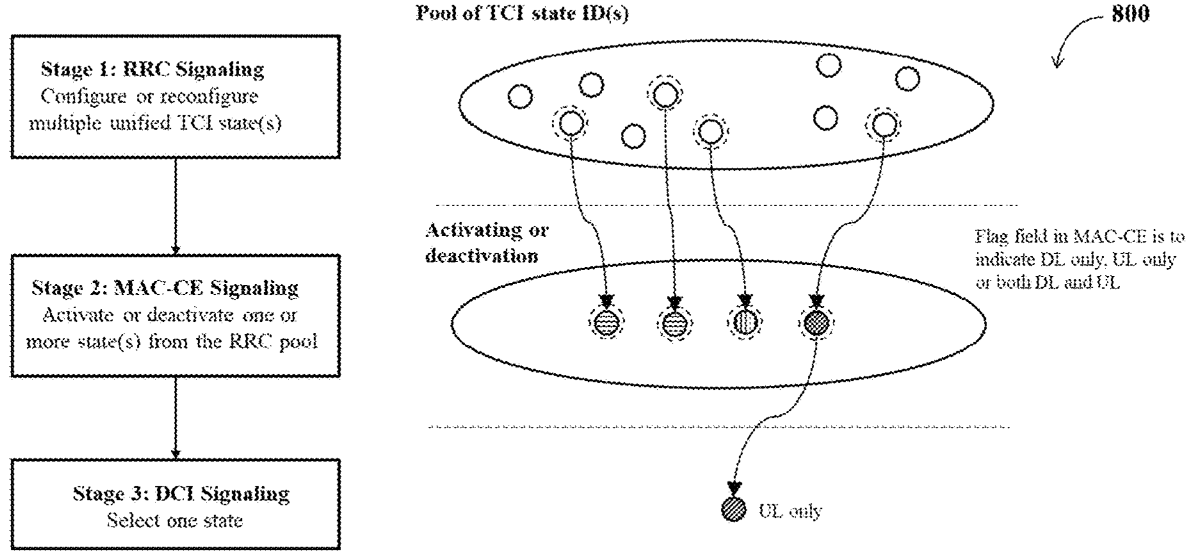
FIG. 8 shows a diagram illustrating an example of configuring candidate beam states for joint and separate DL and UL beam indication, in accordance with example embodiments of the current disclosure.

Referring now to FIG. 8, a diagram 800 illustrating an example of configuring candidate beam states for joint and separate DL and UL beam indication is shown, in accordance with example embodiments of the current disclosure. At the RRC level, there are multiple beam states (e.g., TCI state), each represented by a circle) to be configured. At the MAC level, one or more states are activated (with outer dashed circles around them) with a flag, e.g., DL only, UL only or both DL and UL. Each flag is indicated by a different hashing in FIG. 8. The beam state can be indicated by the TCI field in DCI, and if the state is only related to UL transmission, there is no DL data transmission and an independent HARQ-ACK information associated with the DCI reception.

In some embodiments, two candidate solutions for timeline for beam state indication can be considered or employed. In a first option (denoted as "Option-1" or "Mode-1"), the indicated beam state can be applied X time units after the DCI. In a second option (denoted as "Option-2" or "Mode-2"), the indicated beam state can be applied X time units after HARQ-ACK corresponding to DCI. An RRC parameter can be introduced for determining whether Mode-1 or Mode-2 is applied. For instance, when the RRC parameter is set to mode-1, the above Mode-1 function is applied, otherwise, Mode-2 is applied. When independent HARQ-ACK procedure is initiated directly in response to DCI, the Mode-2 is applied; otherwise, the Mode-1 is applied.

Furthermore, when the beam state is only applied to UL or there is no DL data scheduled by the DCI, the Mode-1 is applied; otherwise, the Mode-2 is applied. Considering that when the beam state is only applied to UL or there is no DL data or transport block (TB) scheduled by the DCI, the beam state can be applied to UL quickly, e.g., immediately applied X time units after the DCI. When the wireless communication node 102 or 202 receives the HARQ-ACK using the new beam indicated by the beam state, the beam update for UL can be performed successfully. Otherwise, the wireless communication node 102 or 202 still can retransmit the DCI to update the beam state again by the original DL beam (it is noticed that in such case, the DL beam is still unchanged.) The support of Mode-1 and/or Mode-2 and minimum value of X corresponding to different modes can depend on the wireless communication device signaling capability.

The various embodiments described above and in the claims can be implemented as computer code instructions that are executed by one or more processors of the wireless communication device (or UE) 104 or 204 or the wireless communication node 102 or 202. A computer-readable medium may store the computer code instructions.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:

receiving, by a wireless communication device from a wireless communication node, a downlink control information (DCI) comprising an indication of a transmission configuration indicator (TCI) state, wherein the DCI foregoes scheduling of a physical downlink shared channel (PDSCH) transmission;

determining, by the wireless communication device, one or more signals to which the TCI state is applied, according to a TCI field in the DCI, and according to a radio resource control (RRC) signaling from the wireless communication node;

according to an absence of scheduling the PDSCH transmission in the DCI:

determining, by the wireless communication device, that the DCI is scrambled by a configured scheduling radio network temporary identifier (CS-RNTI), that a redundancy value (RV) field in the DCI is set to bit values each being '1', and that a new data indicator (NDI) field in the DCI is set to a value of '0';

determining, by the wireless communication device, hybrid automatic repeat request acknowledgement (HARQ-ACK) information according to the DCI; and transmitting, by the wireless communication device to the wireless communication node, an uplink channel that carries the HARQ-ACK information corresponding to the DCI.

2. The method of claim 1, comprising determining, by the wireless communication device, that a modulation and coding scheme (MCS) field in the DCI is set to bit values each being '1'.

3. The method of claim 1, comprising determining, by the wireless communication device, that a frequency domain resource assignment (FDRA) field in the DCI is set to a specific value.

4. A method comprising:

transmitting, by a wireless communication node to a wireless communication device, a downlink control information (DCI) comprising an indication of a transmission configuration indicator (TCI) state, wherein the DCI foregoes scheduling of a physical downlink shared channel (PDSCH) transmission, wherein the DCI is scrambled by a configured scheduling radio network temporary identifier (CS-RNTI), wherein, according to an absence of scheduling the PDSCH transmission, a redundancy value (RV) field in the DCI is set to bit values each being '1', and a new data indicator (NDI) field in the DCI is set to a value of '0';

transmitting, by the wireless communication node to the wireless communication device, a radio resource control (RRC) signaling, the RRC indicating one or more signals to which the TCI state is applied according to the TCI field in the DCI; and receiving, by the wireless communication node from the wireless communication device, an uplink channel that carries hybrid automatic repeat request acknowledgement (HARQ-ACK) information corresponding to the DCI, wherein the HARQ-ACK information is determined according to the DCI, and wherein the uplink channel carrying the HARQ-ACK information corresponding to the DCI is received according to the absence of scheduling the PDSCH transmission in the DCI.

5. The method of claim 4, wherein a modulation and coding scheme (MCS) field in the DCI is set to bit values each being '1'.

6. The method of claim 4, wherein a frequency domain resource assignment (FDRA) field in the DCI is set to a specific value.

7. A wireless communication device, comprising:

at least one processor configured to:

receive, via a transceiver from a wireless communication node, a downlink control information (DCI) comprising an indication of a transmission configuration indicator (TCI) state, wherein the DCI foregoes scheduling of a physical downlink shared channel (PDSCH) transmission;

determine one or more signals to which the TCI state is applied, according to a TCI field in the DCI, and according to a radio resource control (RRC) signaling from the wireless communication node;

according to an absence of scheduling the PDSCH transmission in the DCI:

determine, according to an absence of scheduling the PDSCH transmission, that the DCI is scrambled by a configured scheduling radio network temporary identifier (CS-RNTI), that a redundancy value (RV) field in the DCI is set to bit values each being '1', and that a new data indicator (NDI) field in the DCI is set to a value of '0';

determine hybrid automatic repeat request acknowledgement (HARQ-ACK) information according to the DCI; and transmit, via the transceiver to the wireless communication node, an uplink channel that carries the HARQ-ACK information corresponding to the DCI.

8. The wireless communication device of claim 7, wherein the at least one processor is further configured to determine that a modulation and coding scheme (MCS) field in the DCI is set to bit values each being '1'.

9. The wireless communication device of claim 7, wherein the at least one processor is further configured to determine that a frequency domain resource assignment (FDRA) field in the DCI is set to a specific value.

10. A wireless communication node, comprising:

at least one processor configured to:

transmit, via a transceiver to a wireless communication device, a downlink control information (DCI) comprising an indication of a transmission configuration indicator (TCI) state, wherein the DCI foregoes scheduling of a physical downlink shared channel (PDSCH) transmission, wherein the DCI is scrambled by a configured scheduling radio network temporary identifier (CS-RNTI), wherein, according to an absence of scheduling the PDSCH transmission, a redundancy value (RV) field in the DCI is set to bit values each being '1', and a new data indicator (NDI) field in the DCI is set to a value of '0';

transmit, via the transceiver to the wireless communication device, a radio resource control (RRC) signaling, the RRC indicating one or more signals to which the TCI state is applied according to the TCI field in the DCI; and receive, via the transceiver from the wireless communication device, an uplink channel that carries hybrid automatic repeat request acknowledgement (HARQ-ACK) information corresponding to the DCI, wherein the HARQ-ACK information is determined according to the DCI, and wherein the uplink channel carrying the HARQ-ACK information corresponding to the DCI is received according to the absence of scheduling the PDSCH transmission in the DCI.

11. The wireless communication node of claim 10, wherein a modulation and coding scheme (MCS) field in the DCI is set to bit values each being '1'.

12. The wireless communication node of claim 10, wherein a frequency domain resource assignment (FDRA) field in the DCI is set to a specific value.

* * * * *